US011891255B2

(12) United States Patent
Congedi et al.

(10) Patent No.: US 11,891,255 B2
(45) Date of Patent: Feb. 6, 2024

(54) FLUID CONTROL SYSTEM IN PNEUMATIC CONVEYING DUCTS FOR POWDERED OR GRANULAR MATERIAL

(71) Applicant: NTE HOLDING S.R.L., Gorgonzola (IT)

(72) Inventors: Massimo Congedi, Gorgonzola (IT); Per Magnus Westby, Gorgonzola (IT); Fabio Novelli, Gorgonzola (IT)

(73) Assignee: NTE HOLDING S.R.L., Gorgonzola (IT)

( * ) Notice: Subject to any disclaimer, the term of this patent is extended or adjusted under 35 U.S.C. 154(b) by 0 days.

(21) Appl. No.: 17/916,913

(22) PCT Filed: May 25, 2020

(86) PCT No.: PCT/IT2020/000040
§ 371 (c)(1),
(2) Date: Oct. 4, 2022

(87) PCT Pub. No.: WO2021/240554
PCT Pub. Date: Dec. 2, 2021

(65) Prior Publication Data
US 2023/0150778 A1    May 18, 2023

(51) Int. Cl.
*B65G 53/66* (2006.01)
*B65G 53/06* (2006.01)
*B65G 53/58* (2006.01)

(52) U.S. Cl.
CPC ............. *B65G 53/66* (2013.01); *B65G 53/06* (2013.01); *B65G 53/58* (2013.01)

(58) Field of Classification Search
None
See application file for complete search history.

(56) References Cited

U.S. PATENT DOCUMENTS

| 2,793,085 | A | * | 5/1957 | Ellis | ................. | B65G 53/66 |
| | | | | | | 406/126 |
| 3,295,896 | A | * | 1/1967 | Hurtig | ................. | B65G 53/525 |
| | | | | | | 406/50 |

(Continued)

FOREIGN PATENT DOCUMENTS

| CN | 108584443 A | * | 9/2018 | ............. B65G 53/66 |
| CN | 109178945 A | | 1/2019 | |

(Continued)

OTHER PUBLICATIONS

International Search Report and Written Opinion dated Feb. 23, 2021 from counterpart International Patent Application No. PCT/IT2020/000040.

*Primary Examiner* — Joseph A Dillon, Jr.
(74) *Attorney, Agent, or Firm* — SHUTTLEWORTH & INGERSOLL, PLC; Timothy J. Klima

(57) ABSTRACT

A fluid control system in pneumatic conveying ducts of powdered or granular material, comprising: a supply source of a pressurized gas for transporting said powdered or granular material; an injection line of said gas to put said source in fluid communication with a conveying duct inside which the material is conveyed; a self-regulating pressure valve arranged on the injection line between the source and said duct; a control member of the self-regulating valve to provide a control signal to said valve representing a pressure value, said valve maintaining the gas flow supplied in said duct constant; and a flow and flow rate meter, arranged on the injection line upstream of the valve to transmit a flow and flow rate value to said control member.

18 Claims, 4 Drawing Sheets

(56) References Cited

U.S. PATENT DOCUMENTS

Figure 1:
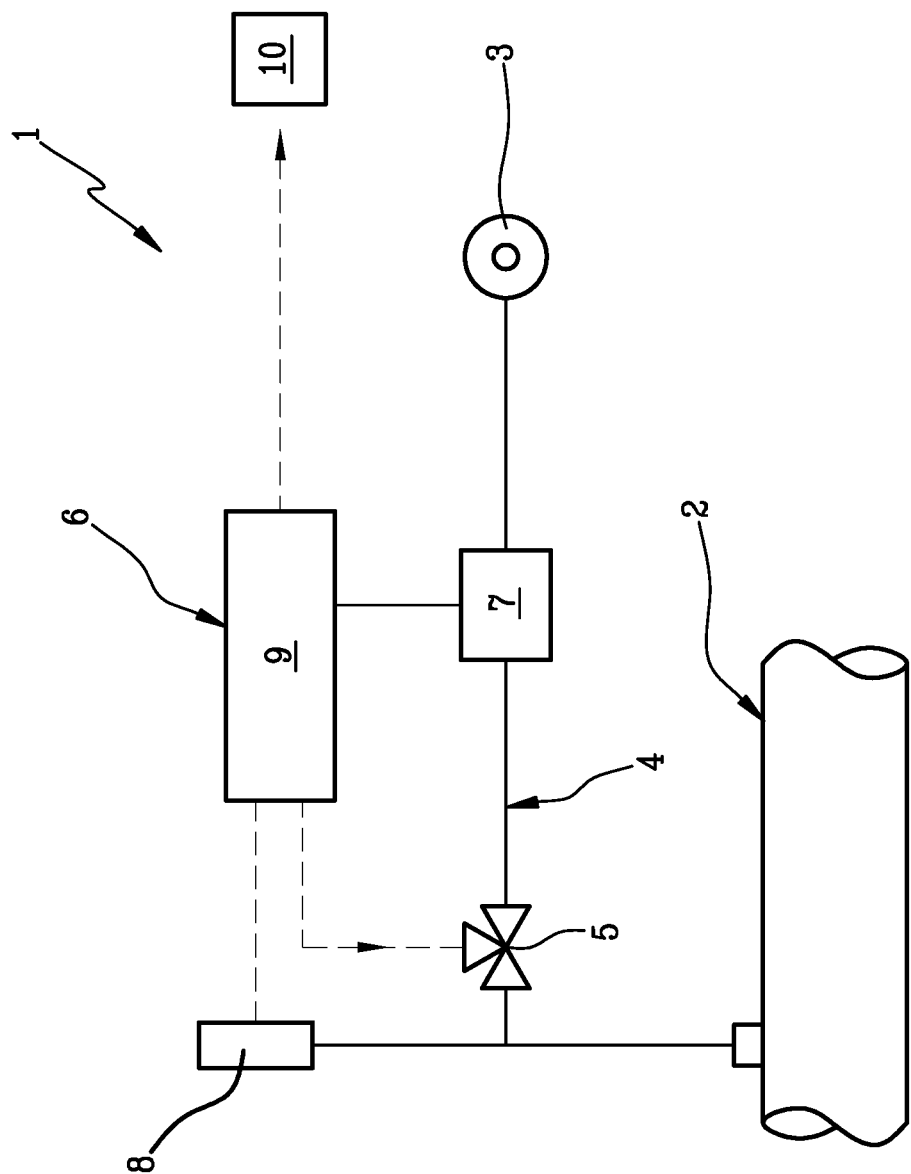

| Patent No. | | Date | Inventor | Classification |
|---|---|---|---|---|
| 3,347,599 | A * | 10/1967 | Topper | B65G 53/66 406/197 |
| 3,537,755 | A * | 11/1970 | Schmidt | C10B 31/00 406/109 |
| 3,649,082 | A * | 3/1972 | Wise | B65G 53/66 406/3 |
| 3,901,555 | A * | 8/1975 | Wise | B65G 53/66 406/3 |
| 4,059,310 | A * | 11/1977 | Waskiewicz | B65G 53/66 406/65 |
| 4,420,279 | A * | 12/1983 | Easley, Jr. | B65G 53/525 406/14 |
| 4,515,503 | A * | 5/1985 | Snowdon | B65G 53/525 406/14 |
| 4,582,454 | A * | 4/1986 | Brandenburg | B65G 53/66 177/128 |
| 4,599,017 | A * | 7/1986 | Russemeyer | B65G 53/525 406/156 |
| 4,715,748 | A * | 12/1987 | Krambrock | B65G 53/525 406/14 |
| 4,715,749 | A * | 12/1987 | Hoppe | B65G 53/521 406/14 |
| 4,861,200 | A * | 8/1989 | Lubbehusen | B65G 53/521 406/14 |
| 4,883,390 | A * | 11/1989 | Reintjes | B65G 53/12 406/137 |
| 4,909,676 | A * | 3/1990 | Heep | B65G 53/521 406/14 |
| 4,936,715 | A * | 6/1990 | Wolf | B65G 53/521 406/14 |
| 5,240,355 | A * | 8/1993 | Hudalla | B65G 53/521 406/93 |
| 5,252,007 | A * | 10/1993 | Klinzing | B65G 53/66 406/14 |
| 5,562,366 | A * | 10/1996 | Paulson | B65G 53/525 406/28 |
| 5,584,612 | A * | 12/1996 | Nolan | B65G 53/66 406/11 |
| 5,775,851 | A * | 7/1998 | Waeschle | B65G 53/521 406/14 |
| 6,106,202 | A * | 8/2000 | Nolan | B65G 53/525 406/10 |
| 6,287,056 | B1 * | 9/2001 | Szikszay | B65G 53/66 406/146 |
| 6,386,800 | B1 * | 5/2002 | van Eyck | B65G 53/525 406/146 |
| 6,786,681 | B2 * | 9/2004 | Grasshoff | B65G 53/521 406/127 |
| 6,935,813 | B2 * | 8/2005 | Van Dorst | B65G 53/66 406/14 |
| 7,048,475 | B2 * | 5/2006 | Cloue | B65G 53/16 406/123 |
| 7,192,222 | B2 * | 3/2007 | Van Mullekom | B65G 53/521 406/197 |
| 7,556,455 | B2 * | 7/2009 | Relin | B65G 23/00 406/12 |
| 8,915,679 | B2 * | 12/2014 | Walukiewicz | B65G 53/66 406/30 |
| 9,440,803 | B1 * | 9/2016 | Martin | B65G 67/06 |
| 10,093,492 | B2 * | 10/2018 | Brewster | B65G 53/66 |
| 10,549,932 | B2 * | 2/2020 | Henry | A01C 7/206 |
| 10,696,496 | B2 * | 6/2020 | Ellis | B65G 53/521 |
| 11,760,583 | B2 * | 9/2023 | Ellis | B65G 53/66 406/154 |
| 2003/0185635 | A1 * | 10/2003 | Van Dorst | B65G 53/66 406/10 |
| 2008/0131213 | A1 * | 6/2008 | Peet | B65G 53/66 406/14 |
| 2009/0148244 | A1 * | 6/2009 | Snowdon | B65G 53/66 406/28 |
| 2019/0210817 | A1 * | 7/2019 | Ellis | B65G 53/58 |
| 2022/0219918 | A1 * | 7/2022 | Ellis | B65G 53/66 |
| 2023/0010395 | A1 * | 1/2023 | Thomas | B65G 53/24 |

FOREIGN PATENT DOCUMENTS

| Country | Number | | Date | Classification |
|---|---|---|---|---|
| CN | 114044365 | A * | 2/2022 | |
| DE | 3037517 | A1 * | 4/1982 | |
| DE | 4109960 | A1 | 10/1992 | |
| GB | 2085388 | A | 4/1982 | |
| GB | 2585462 | A * | 1/2021 | B65G 53/526 |
| IT | 1262314 | B | 6/1996 | |
| JP | 01127523 | A * | 5/1989 | |
| JP | H11130257 | A | 5/1999 | |
| WO | 9856696 | A1 | 12/1998 | |
| WO | 2019200710 | A1 | 10/2019 | |
| WO | WO-2021240554 | A1 * | 12/2021 | B65G 53/521 |

* cited by examiner

FLUID CONTROL SYSTEM IN PNEUMATIC CONVEYING DUCTS FOR POWDERED OR GRANULAR MATERIAL

This application is the National Phase of International Application PCT/IT2020/000040 filed May 25, 2020 which designated the U.S.

The present invention relates to a fluid control system in pneumatic conveying ducts for powdered or granular material.

In particular, the present invention relates to a system for regulating the operating parameters of the fluid that is supplied into ducts for handling the powdered or granular material along respective processing lines of such material.

For this purpose, the control system of the present invention finds particular application in pneumatic systems of various kinds, in which it is necessary to bring the granular material among different processing stations that may be of various types.

As is known, in systems of the type described above, the granular or powdered material is supplied into the passage ducts with the thrust of pressurized air (or vacuum in the case of suction of the material) or other pressurized gas suitably selected according to the type of material to be handled.

In this way, the fluid flow conveys and transports the material along the entire path of the plant which may be defined by one or more ducts in communication with each other.

Generally, the injection of the pressurized gas is carried out at specific points in the duct in order to generate a flow having optimal pressure and flow values, which translate into the conveying speed of the material.

Each injection point has a supply line of the pressurized gas, suitably connected to the duct and equipped with gas pressure and flow regulating devices.

According to a solution known and described in Italian patent no. 01262314, a regulation is made at each specific injection point of the conveying gas by means of a manual air flow regulation valve and a self-regulating pressure valve controlled under pressure.

In this way, a manual adjustment of the pressure of each individual injection point is carried out (by means of a common pressure signal) and a pressure drop is introduced to reduce the flow rate resulting from the difference between the injection gas pressure and the back pressure inside the duct. In this regard, it should be specified that the back pressure inside the duct, under normal conditions, is always lower than the injection pressure of the conveying gas.

Japanese patent publication JPH11130257A also provides for a control and regulation system arranged near the powdered and/or granular product introduction zone, and adapted to supply said product along a respective line.

This document describes a valve-based regulation that regulates the flow passage section to obtain a constant downstream pressure. In this case the pressure regulation is manual and there are proportional automatic valves with shutters downstream capable of varying the flow passage section.

The known regulation systems, although capable of controlling the values of the gas conveying the granular or powdered material, nevertheless have some drawbacks and can be improved in several aspects.

These drawbacks primarily result from the manual regulation action by means of direct action on the flow rate regulation valve. In this context, in fact, the regulation operations at each gas injection point are particularly long and laborious, as they require manual intervention on each injection point present throughout the entire system.

Furthermore, the known systems do not allow to optimize the operating parameters depending on the type of granular or powdered material to be conveyed.

In this regard, it should also be considered that the same plant is used for conveying different materials and therefore they do not have the same behaviours in the individual transport steps relating to their nature and the particle size of the material itself.

In this context, the absence of a regulation of the operating parameters with respect to the material may result in an incorrect supply or even damage to the material itself inside the conveying ducts.

Moreover, the rigidity of the known systems in terms of flexibility in the variation of operating parameters, does not allow to maximize the flow rate and reduce gas consumption depending on individual needs, or in any case to optimize the conveying parameters compared to a target parameter in general.

In addition, known solutions that provide for injection only into the material inlet zone (as described in JPH11130257A), have the major drawback of not allowing the dispensing in separate individual blocks of material, in this case the material is pushed only from the launch zone and there is no possibility of managing the advancement directly along the line. Moreover, this document is not adaptable to the rapid variations in conditions on the line that cause, for example, pressure spikes. In this case, the regulation system would not be fast enough to cope with such variations.

In this context, the technical task underlying the present invention is to propose a fluid control system in pneumatic conveying ducts for powdered or granular material which overcomes the drawbacks of the prior art mentioned above.

In particular, an object of the present invention is to provide a control system that is able to control the injection of conveying gas at each single point and automatically in order to adapt at all times the optimal conveying conditions according to the specific operating needs and the characteristics of the granular or powdered material to be conveyed.

Furthermore, another object of the present invention is to provide a control system able to reduce the gas consumption in order to implement energy saving in the operation of the entire plant. Similarly, a further object is to use the device to optimize the system with respect to any objective parameter.

The outlined technical task and the specified object are basically achieved by a fluid control system in pneumatic conveying ducts for powdered or granular material comprising the technical specifications set out in one or more of the appended claims.

Further features and advantages of the present invention will be more apparent from the approximate, and hence non-limiting description of a preferred, but not exclusive, embodiment of a fluid control system in pneumatic conveying ducts for powdered or granular material, as illustrated in FIGS. 1-4, which show block diagrams in respective embodiments of the control system according to the present invention.

As shown in the appended figures, the reference number 1 globally indicates a fluid control system in pneumatic conveying ducts of powdered or granular material.

Preferably, the present invention relates to a control system 1 usable in plants of any type. For this purpose, a set of systems 1 of the present invention may be provided, located at different in-line injection sites within the same pneumatic system.

Each control system 1 is operative at a point for injecting pressurized gas into a respective pneumatic conveying duct 2 of the aforementioned powdered or granular material. Advantageously, a series of systems 1 are provided for the same duct 2, each of which is arranged at specific pressurized gas injection points. These points are appropriately spaced in order to always obtain a control of the products' advancement along the entire duct 2.

The control system therefore comprises a plurality of sources 3 for supplying a pressurized gas, such as air, nitrogen or other gases suitably selected according to the type of material to be handled.

Figure 2:
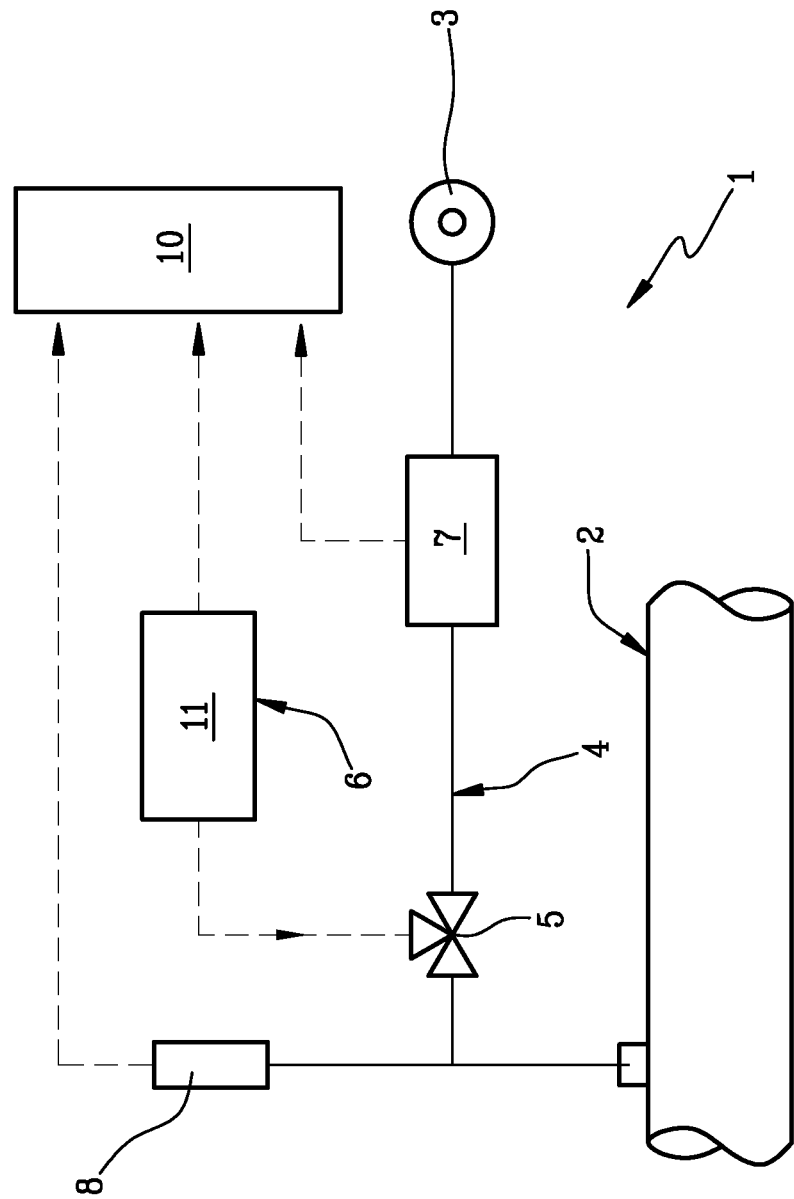
Figure 3:
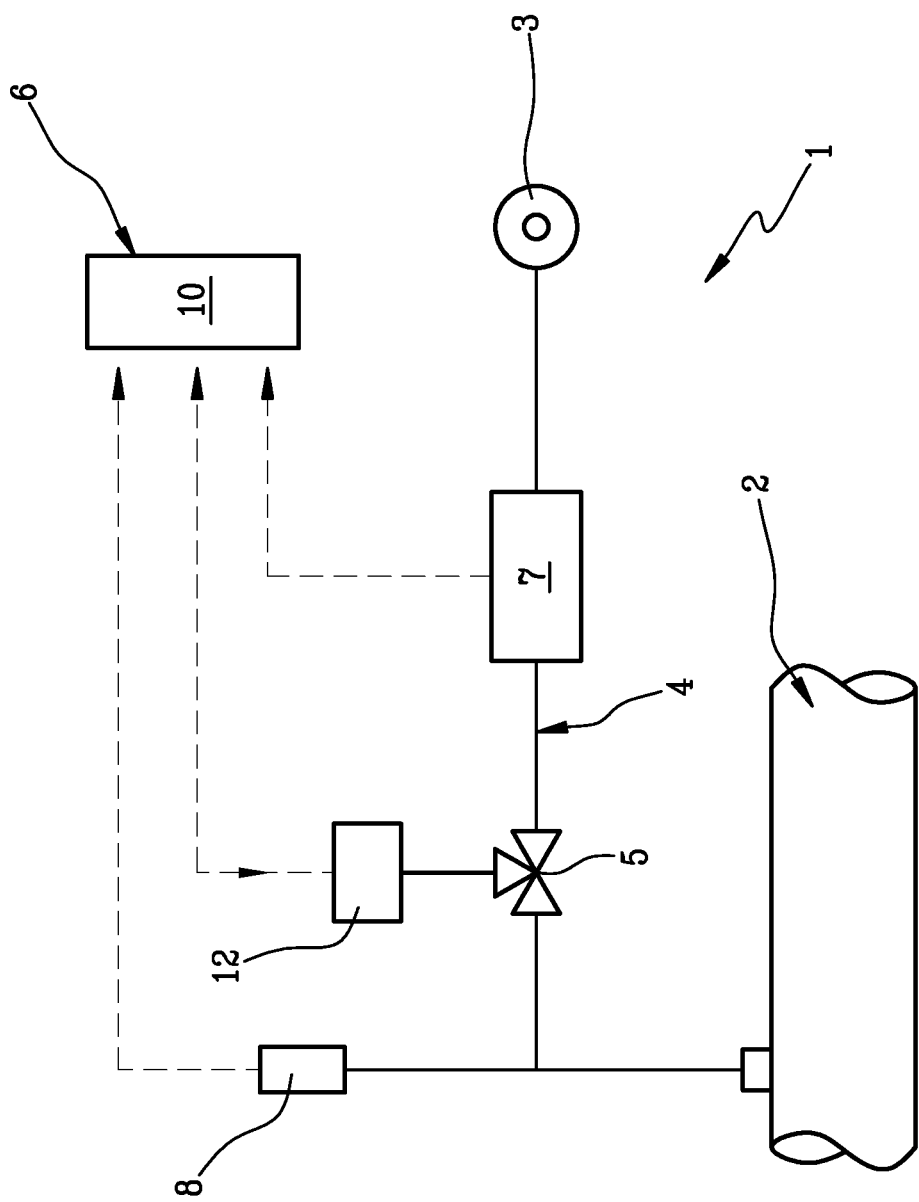
Figure 4:
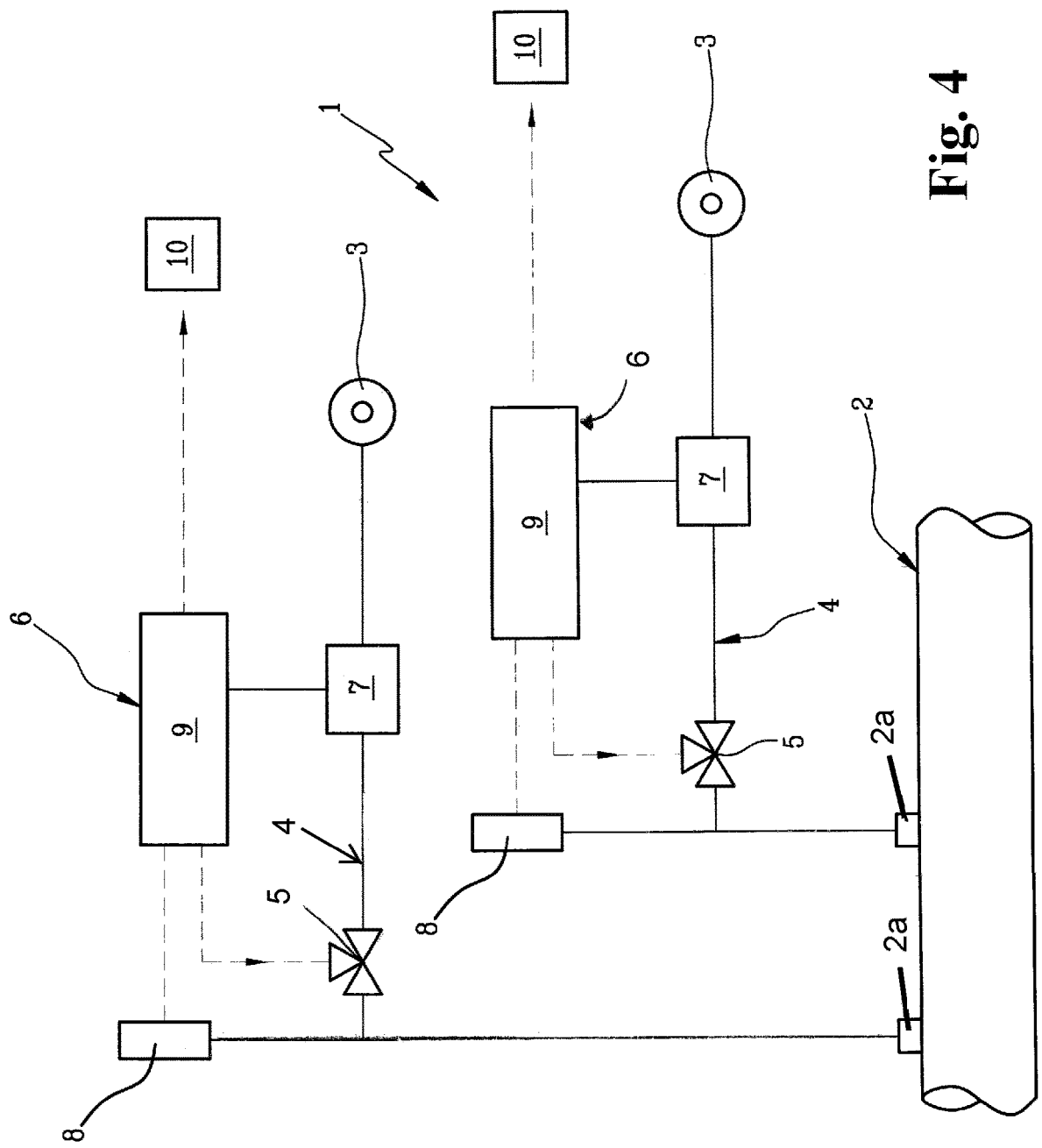

It should be specified that in the appended FIGS. 1-3 only one section of the duct 2 at a single source 3 is illustrated purely by way of example. The present invention, however, as shown in FIG. 4 comprises a series of gas supply sources 3 at respective injection points 2a suitably spaced along the duct 2 from a product loading station to an unloading station.

The gas supplied by each source 3 is conveyed inside the duct 2, at the respective injection point 2a by means of a gas injection line 4. The injection line 4, consisting of suitable connection pipes, puts the source 3 in fluid communication with the respective conveying duct 2 inside which the material is handled.

The system 1 also comprises a plurality of self-regulating pressure valves 5, each arranged on the injection line 4 between the source 3 and the injection point 2a.

Preferably, the self-regulating pressure valve 5 is a pressure-controlled valve. The valve 5 is in a determined "no relieving" configuration, thus it is adapted to prevent the entry of a return gas ("dirty" gas) from the duct 2. In fact, in conditions where the pressure inside the duct 2 is greater than the regulating pressure, the gas may return towards the valve 5.

Other technically equivalent devices may be provided and adapted to prevent the return of "dirty" gas.

The system 1 also comprises a plurality of control members 6 of the respective self-regulating valves 5 for providing a control signal to each valve 5 representing a pressure value.

The valve 5 regulates the gas pressure as a function of the control signal and keeping the supplied gas flow in the duct 2 constant.

In other words, unlike what is described above with reference to the state of the art in which the regulation system is active on the flow by moving the gas passage section, in this case each valve 5 intervenes on the pressure regulation while maintaining the flow constant.

A plurality of flow and flow rate meters 7 are further provided, each arranged on the injection line 4 upstream of a respective valve 5 and configured to transmit a flow and flow rate value to the control member 6.

Advantageously, a pressure meter 8 may also be provided arranged on the injection line 4 downstream of the valve 5 and close to the injection point 2a to transmit to the control member 6 a pressure value detected at the duct 2.

According to a first embodiment diagrammed in FIG. 1, each control member 6 is in the form of a local integrated electronic device 9 comprising a current/pressure converter.

In this situation, the local integrated electronic device 9 can be associated with a centralized control unit 10 which manages a plurality of control systems 1.

In other words, the centralized unit 10 is associated with a plurality of local integrated electronic devices 9 each of which operating on a respective injection line 4.

Advantageously, it is possible to intervene directly on the local control member 6 to change the operating parameters in the single injection line 4. Alternatively, the centralized unit 10 may command a series of control members 6 of respective systems 1 separately located in a single plant to change the transport parameters along the entire duct 2 into which the gas is injected.

According to a second embodiment shown in FIG. 2, the control member 6 comprises a local proportional valve 11 controlled by a centralized electronic unit 10.

Also in this case, the centralized electronic unit 10 (e.g., a PLC, i.e., a programmable logic controller or controller for short) is associated with a plurality of control members 6 of respective systems 1 each of which is operatively active on a respective injection line 4.

In this situation, which does not provide for the possibility of local intervention, the flow and flow rate meter 7 and the possible pressure meter 8 are directly connected to the centralized electronic unit 10.

Still, in accordance with a further embodiment illustrated in FIG. 3, the self-regulating valve 5 is provided with a current/pressure converter 12. In this situation, the control member 6 is not local but is in the form of a centralized electronic unit 10.

Thus the regulation of each valve 5 is implemented only centrally, to change the operating parameters in each gas injection line 4 that may be present in a plant.

Accordingly, also in this case the flow and flow rate meter 7 and any pressure meter 8 are directly associated with the centralized electronic unit 10.

The system 1 described above in the three embodiments therefore maintains a flow value in each line 4 which is constant and continuously set remotely by means of the pressure command generated by each control member 6.

At the same time, a remotely adjustable maximum pressure limit value is set for each individual valve 5 by the control member 6.

In this way, a regulation is obtained that maintains the gas flow introduced into the duct 2 constant without allowing the same gas to exceed a maximum pressure limit value that is considered optimal for the system 1 under certain conditions.

This limit value is in fact set according to the type of powdered or granular material, or according to the gas injection zone.

In addition, the pressure value detected by the meter 8 near the injection site 2a may be used to modify the control criteria and adjustment parameters and to adapt the local or general parameters to the new system conditions.

Furthermore, the gas injection flow rate (required in the specific point 2a) is reduced when the pressure value in the duct 2 is lower than a predetermined threshold value. Advantageously, under certain conditions it is therefore possible to reduce the gas consumption in line 4, obtaining a considerable energy saving.

Likewise, when the pressure at the injection point 2a exceeds a fixed value, the system 1 may decide to use optimized parameters with respect to the new condition that in this case could be of incipient blockage of the transport line. The latter condition therefore determines a safety measure for the entire system and the material handled in the respective ducts 2.

In other words, for each line 4 a self-regulating valve 5 is provided, controlled under pressure, which intervenes on the pressure regulation in a mechanical way in order to regulate the flow thereof.

Advantageously, the system intervenes very quickly, limiting any pressure peaks due to regulation transients in the face of rapid changes in conditions (typical in direct injection along the duct).

Note that in the present invention the injection is not limited at the loading zone of the product. In fact, the lines 4 inject the gas along the entire extension of the duct 2 and at predefined distances.

In this situation, it is possible to separate the product into blocks and push the blocks from the various injectors distributed on the duct 2.

The thrust of each block is controlled and it is possible to intervene quickly on the various pressure peaks derived precisely from the separate passage of these blocks.

Further to the above, the possibility of introducing a fixed pressure drop by means of a needle valve or calibrated orifice may also be provided.

In this way, the regulation of the system is made more precise within the range of use.

The invention claimed is:

1. A fluid control system in a pneumatic conveying duct for powdered or granular material, comprising:
   a conveying duct inside which the powdered or granular material is conveyed;
   a plurality of supply sources of respective pressurized gases for transporting said powdered or granular material inside said conveying duct;
   a plurality of injection lines of said gases to respectively put the supply sources in fluid communication with said conveying duct;
   a plurality of self-regulating pressure valves arranged respectively on the injection lines between the respective supply sources and said conveying duct;
   a plurality of control members respectively operatively connected to the self-regulating pressure valves to respectively provide command signals, representing pressure values, to the self-regulating pressure valves, each of the self-regulating pressure valves maintaining constant gas flow values supplied in said conveying duct;
   a plurality of flow and flow rate meters, respectively arranged on the injection lines upstream of the self-regulating pressure valves to transmit a-flow and flow rate values to the control members;
   a plurality of pressure meters arranged respectively on the injection lines downstream of the self-regulating pressure valves and close to the conveying duct to respectively transmit pressure values to the control members,
   the control members determining pressure and/or flow parameters regulated by the respective self-regulating pressure valves depending on pressure values detected by the pressure meters.

2. The system according to claim 1, wherein each of the control members is a local integrated electronic device comprising a current/pressure converter.

3. The system according to claim 1, and further comprising a single centralized controller; and wherein each of the control members include respective integrated electronic devices associable with the single centralized controller.

4. The system according to claim 1, and further comprising a single centralized controller; and wherein each of the control members comprises a local proportional valve controlled by the single centralized controller.

5. The system according to claim 1, and further comprising a single centralized controller; and wherein said flow and flow rate meters and/or said pressure meters are directly operatively connected with the single centralized controller.

6. The system according to claim 1, wherein each of the self-regulating pressure valves comprises a current/pressure converter; each of the control members including a controller respectively operatively connected said plurality of self-regulating pressure valves each of the self-regulating pressure valves being operatively active on a respective one of the injection lines.

7. The system according to claim 1, wherein said constant flow value is continuously set remotely by said control members.

8. The system according to claim 1, and further comprising pressure limit values regulated respectively by the self-regulating pressure valves, the maximum pressure limit values respectively being continuously and remotely set by the control members.

9. The system according to claim 1, wherein said injection lines are arranged along the conveying duct at predetermined distances to determine a plurality of product blocks pushed by each of the injection lines.

10. A fluid control system in a pneumatic conveying duct for powdered or granular material, comprising:
    a conveying duct inside which the powdered or granular material is conveyed;
    a plurality of supply sources of respective pressurized gases for transporting said powdered or granular material inside said conveying duct;
    a plurality of injection lines of said gases to respectively put the supply sources in fluid communication with said conveying duct;
    a plurality of self-regulating pressure valves arranged respectively on the injection lines between the respective supply sources and said conveying duct;
    a plurality of control members respectively operatively connected to the self-regulating pressure valves to respectively provide command signals, representing pressure values, to the self-regulating pressure valves, each of the self-regulating pressure valves maintaining constant gas flow values supplied in said conveying duct;
    a plurality of flow and flow rate meters, respectively arranged on the injection lines upstream of the self-regulating pressure valves to transmit flow and flow rate values to the control members;
    a single centralized controller; and
    wherein each of the control members comprises a local proportional valve controlled by the single centralized controller.

11. The system according to claim 10, wherein each of the control members is a local integrated electronic device comprising a current/pressure converter.

12. The system according to claim 10, wherein each of the control members include respective integrated electronic devices associable with the single centralized controller.

13. The system according to claim 10, wherein each of the control members comprises a local proportional valve controlled by the single centralized controller.

14. The system according to claim 10, wherein said flow and flow rate meters and/or said pressure meters are directly operatively connected with the single centralized controller.

15. The system according to claim 10, wherein each of the self-regulating pressure valves comprises a current/pressure converter; each of the control members including a controller respectively operatively connected said plurality of self-regulating pressure valves each of the self-regulating pressure valves being operatively active on a respective one of the injection lines.

16. The system according to claim 10, wherein said constant flow value is continuously set remotely by said control members.

17. The system according to claim 10, and further comprising maximum pressure limit values regulated respectively by the self-regulating pressure valves, the maximum pressure limit values respectively being continuously and remotely set by the control members.

18. The system according to claim 10, wherein said injection lines are arranged along the conveying duct at predetermined distances to determine a plurality of product blocks pushed by each of the injection lines.

\* \* \* \* \*